United States Patent
Singh et al.

(10) Patent No.: US 10,586,256 B2
(45) Date of Patent: Mar. 10, 2020

(54) SYSTEMS AND METHODS FOR CONTEXT BASED ENGAGEMENT IN ADVERTISEMENT

(71) Applicant: FMR LLC, Boston, MA (US)

(72) Inventors: Harmeet Singh, Somerville, MA (US); Carsten Miller, Cambridge, MA (US)

(73) Assignee: FMR LLC, Boston, MA (US)

(*) Notice: Subject to any disclaimer, the term of this patent is extended or adjusted under 35 U.S.C. 154(b) by 308 days.

(21) Appl. No.: 15/619,940

(22) Filed: Jun. 12, 2017

(65) Prior Publication Data
US 2018/0357680 A1  Dec. 13, 2018

(51) Int. Cl.
G06Q 30/00 (2012.01)
G06Q 30/02 (2012.01)
G06Q 30/06 (2012.01)

(52) U.S. Cl.
CPC ........ *G06Q 30/0277* (2013.01); *G06Q 30/016* (2013.01); *G06Q 30/0256* (2013.01); *G06Q 30/06* (2013.01); *G06Q 30/0617* (2013.01); *G06Q 30/0625* (2013.01)

(58) Field of Classification Search
CPC .......... G06Q 30/0277; G06Q 30/0625; G06Q 30/0617; G06Q 30/0256; G06Q 30/06; G06Q 30/016
USPC ...................................................... 705/26, 27
See application file for complete search history.

(56) References Cited

U.S. PATENT DOCUMENTS

| | | |
|---|---|---|
| 9,152,976 B2 | 10/2015 | Altberg et al. |
| 9,357,073 B2 | 5/2016 | Tuchman et al. |
| 9,419,821 B2 | 8/2016 | Ilagan |
| 9,654,640 B1 * | 5/2017 | Brydon .............. H04M 3/5233 |
| 2007/0100956 A1 | 5/2007 | Kumar |
| 2008/0215991 A1 * | 9/2008 | Berko .................... G06Q 30/02 715/753 |
| 2008/0288349 A1 * | 11/2008 | Weisberg ............... G06Q 30/02 705/14.54 |

(Continued)

OTHER PUBLICATIONS

"Rich media entices a wealth of customers," Dwyer, Lexi. Web Techniques 5.6: 56-60. MultiMedia Healthcare Inc. (Jun. 2000); Dialog 8pgs. (Year: 2000).*

*Primary Examiner* — Robert M Pond
(74) *Attorney, Agent, or Firm* — Proskauer Rose LLP

(57) ABSTRACT

A computer-implemented method is provided for facilitating live communication between a potential customer and an enterprise in relation to a product. The method includes causing to display, by a computing device on a webpage over a communications network, an interactive banner located on the webpage that includes advertisement content related to the product. The advertisement content includes an offer to the potential customer to communicate live with the enterprise about the product. The method includes adding to the context information, by the computing device, information related to an interaction over the communications network between the potential customer and the interactive banner. The method further includes adjusting, by the computing device over the communications network, the advertisement content in the interactive banner on the webpage if the potential customer accepts the offer. The adjusted advertisement content includes one or more possible discussion topics related to the advertised product customized based on the context information.

19 Claims, 4 Drawing Sheets

(56) References Cited

U.S. PATENT DOCUMENTS

| | | | |
|---|---|---|---|
| 2009/0190744 A1* | 7/2009 | Xie | H04M 3/5232 |
| | | | 379/265.11 |
| 2010/0114706 A1 | 5/2010 | Kosuru | |
| 2011/0055309 A1 | 3/2011 | Gibor et al. | |
| 2016/0005087 A1 | 1/2016 | Altberg et al. | |

* cited by examiner

SYSTEMS AND METHODS FOR CONTEXT BASED ENGAGEMENT IN ADVERTISEMENT

TECHNICAL FIELD

This application relates generally to systems, methods and apparatuses, including computer program products, for facilitating dynamic, live communication between a potential customer and an enterprise in relation to an advertised product.

BACKGROUND

Today's computing environment lacks the capability to provide advertisement (e.g., sales offers) to customers over the Internet that take into account of rich context information related to both the customers and the sales representatives. For example, there is a lack of computing infrastructure that facilitates live, targeted communication between a potential customer and a sales representative over the Internet that leads to an interactive conversation thereafter. Without such a capability, an enterprise is at a loss in terms of understanding and meeting its customer's needs in a timely fashion (e.g., in real time or in near real time). Even though banner-based marketing and advertisement over webpages are known, these banners are often static, non-interactive, and primarily rooted in theory-based assumptions that have limited capability to track real customer interests, which ultimately diminishes sales opportunities.

SUMMARY

Accordingly, there is a need for improved systems and methods that can offer context-based advertisement, including sales opportunities, between sales representatives and customers in real time or in near real time over a variety of communication channels, such as over the Internet and/or voice communication channels. For example, an initial contact between a potential customer and an enterprise can be made primarily over the web with respect to an advertised product. As the potential customer increases his interactions with the enterprise in relation to the product, context information related to the interaction can be collected and analyzed. Further, the systems and methods of the present invention can encourage the development of more context information by using analytics and algorithms to match the potential customer with a suitable sales representative over the web based on the context information already collected. If the potential customer chooses to engage live with the selected representative, the engagement can lead to further interactions (e.g., in the form of a follow-up chat session), thus further build on the body of context information, which can result in enhanced sales opportunities. Generally, context information can include any pertinent information relevant to the advertised product, such as customer history, assigned representative status and/or market conditions.

In one aspect, a computer-implemented method is provided for facilitating live communication between a potential customer and an enterprise in relation to a product. The method includes causing to display, by a computing device on a webpage over a communications network, an interactive banner located on the webpage that includes advertisement content related to the product. The advertisement content comprises an offer to the potential customer to communicate live with the enterprise about the product. The offer is determined based on context information that includes at least availability of one or more representatives of the enterprise. The method also includes adding to the context information, by the computing device, information related to an interaction over the communications network between the potential customer and the interactive banner. The information includes an indication by the potential customer regarding whether to accept the offer to communicate live, if the offer is made over the interactive banner. The method further includes adjusting, by the computing device over the communications network, the advertisement content in the interactive banner on the webpage if the potential customer accepts the offer. The adjusted advertisement content includes one or more possible discussion topics related to the advertised product customized based on the context information. The method further includes adding to the context information, by the computing device, selection of at least one of the possible discussion topics by the potential customer via the interactive banner over the communications network and selecting, by the computing device, a representative from the one or more available representatives for live communication with the potential customer. Selection of the representative is based on matching the context information with information about the one or more representatives.

In some embodiments, the method further includes the selected representative contacting the potential customer over a second communications network to discuss the at least one selected discussion topic, where the second communication network comprising one of an internet or voice network. The second communications network can be the same as or different from the communications network. In some embodiments, the method further includes automatically determining a communication channel between the selected representative and the potential customer based on at least one of a location of the potential customer or a computing device on which the potential customer accessed the advertisement content.

In some embodiments, the information about the one or more representatives comprises at least one of experience, education or expertise of the representatives. In some embodiments, the context information further comprises one or more of a market condition, information about the potential customer, information about each available representative, a time of day, and a time of year. The information about the potential customer can comprise one or more of a location of the potential customer, a response time of the potential customer to the advertisement content in the interactive banner, or a topic of interest expressed by the potential customer.

In some embodiments, the method further comprises presenting the interactive banner as a static banner without displaying the offer to communicate live, if there is no availability among the one or more representatives. In addition, a virtual agent or an option to schedule a callback can be displayed on the static banner.

In some embodiments, the method further comprises customizing, by the computing device, the possible discussion topics based on expertise of one or more of the representatives who are available to communicate live.

In some embodiments, the availability of the one or more representatives is updated based on a number of indications received from potential customers to communicate live, a number of indications received from potential customers rejecting live communication and a number of failed attempts to communicate live. In some embodiments, the one or more representatives is prioritized based on the context information by assigning the one or more representatives to potential customers who are likely to make a purchase.

In some embodiments, the interactive banner further displays at least a portion of the information about the selected representative.

In some embodiments, the context information is updated to incorporate feedback from the selected representative on the live communication. In some embodiments, more targeted advertisement content is offered to the potential customer, where the more targeted advertisement content customized based on the updated context information.

In another aspect, a computer program product, tangibly embodied in a non-transitory computer readable storage device, is provided for facilitating live communication between a potential customer and an enterprise in relation to a product. The computer program product includes instructions operable to cause the client computing device to cause to display on a webpage over a communications network an interactive banner that includes advertisement content related to the product. The advertisement content comprises an offer to the potential customer to communicate live with the enterprise about the product. The offer is determined based on context information that includes at least availability of one or more representatives of the enterprise. The computer program product also includes instructions operable to cause the client computing device to receive information related to an interaction over the communications network between the potential customer and the interactive banner, where the information includes an indication from the potential customer regarding whether to accept the offer to communicate live if the offer is made over the interactive banner, and add to the context information the received information. The computer program product additionally includes instructions operable to cause the client computing device to adjust the advertisement content in the interactive banner on the webpage, if the potential customer accepts the offer. The adjusted advertisement content including one or more possible discussion topics related to the advertised product customized based on the context information. The computer program product further includes instructions operable to cause the client computing device to add to the context information selection of at least one of the possible discussion topics by the potential customer via the interactive banner over the communication network, and select a representative from the one or more available representatives for live communication with the potential customer. Selection of the representative is based on matching the context information with information about the one or more representatives.

In some embodiments, the context information further comprises one or more of a market condition, information about the potential customer, information about each available representative, nature of the advertised product, a time of day and a time of year. In some embodiments, the information about the one or more representatives comprises at least one of experience, education or expertise of the representatives.

In some embodiments, the computer program product further comprises instructions operable to cause the client computing device to present the interactive banner as a static banner without displaying the offer to communicate live, if there is no availability among the one or more representatives.

In some embodiments, the computer program product further comprises instructions operable to cause the client computing device to prioritize the one or more representatives by matching, based on the context information, the representatives to potential customers who are likely to make a purchase.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

The present invention features systems and methods for building context information related to sales opportunities between customers and sales representatives over a variety of interactive channels, including the Internet and voice-based communication channels. In some embodiments, context information is collected from web-based interactions. In addition, systems and methods of the present invention can match suitable sales representatives with potential customers using the collected context information, thereby further augmenting the context information from the resulting engagement. For example, customers can choose to speak with the assigned representatives in a call-back scenario and the conversation can be not only enhanced by the context information collected, but also used to enhance the context information itself.

Figure 1:
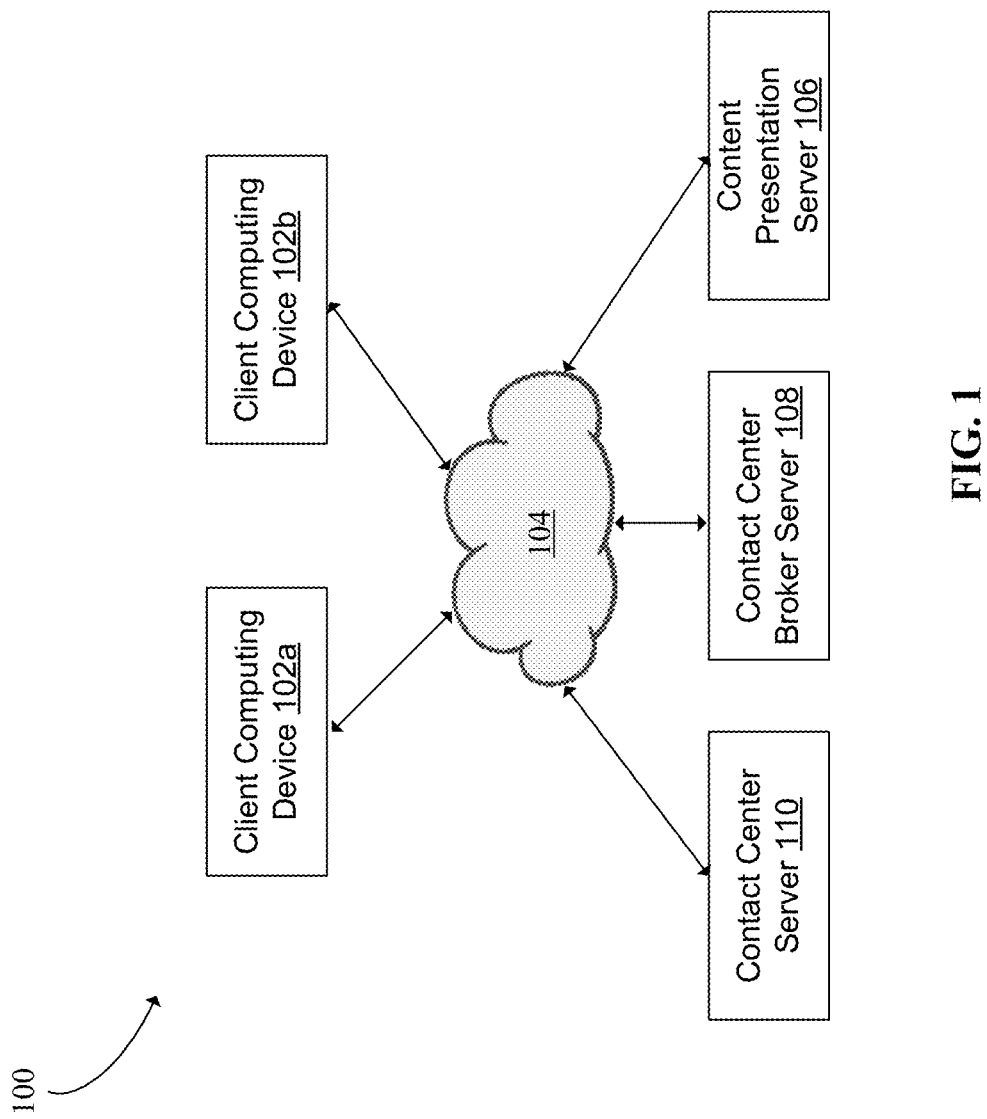
FIG. 1 is a block diagram of a system used in a computing environment in which context-based engagement between potential customers and representatives occur, according to an illustrative embodiment of the invention.

FIG. 1 is a block diagram of a system 100 used in a computing environment in which context-based engagement between potential customers and representatives occur, according to an illustrative embodiment of the invention. As shown, the system 100 includes one or more client computing devices 102, a communications network 104, a content presentation server 106, a contact center broker server 108, and a contact center server 110.

The communications network 104 enables the components of the system 100 to communicate with each other to perform the processes of context-based customer-representative engagement as described herein. The communications network 104 may be a local network, such as a LAN, or a wide area network, such as the Internet and/or a cellular network. In some embodiments, the network 104 is comprised of several discrete networks and/or sub-networks (e.g., cellular to Internet) that enable the components of the system 100 to communicate with each other.

A potential customer is adapted to interact with content provided by the content presentation server 106 (e.g., affiliated with a content host site) over the communications network 104 via a client computing device 102. For example, the potential customer, via his client computing device 102, can engage with an interactive product advertisement (e.g., an advertisement banner) provided by the content presentation server 106 that is displayed on a particular website. Exemplary client devices 102 include but are not limited to desktop computers, laptop computers, tablets, mobile devices, smartphones, and internet appliances. It should be appreciated that other types of computing devices that are capable of connecting to the components of the system 100 can be used without departing from the scope of invention.

Generally, the content center broker server 108 functions as a gatekeeper to transmit information back and forth between the backend contact center server 110 and the content presentation server 106. In some embodiments, the content center broker server 108 provides to the content presentation server 106 certain advertisement content for display via a webpage, where the advertisement content is determined by the contact center server 110. The advertisement content can be live, dynamic and/or tailored to the potential customer associated with the client computing device 102 based on pertinent context information. For example, the content center server 110, via the content center broker server 108, can offer a potential customer an opportunity to chat with a sales representative who is dynamically matched to the potential customer based on the context information constructed. In addition to developing advertisement content for each potential customer, the contact center server 110 is also configured to maintain (i) context information about each potential customer, (ii) analytical and statistical information related to offered products, and (iii) information about a pool of sales representatives that can be matched with potential customers.

In some embodiments, the content presentation server 106 is configured to continuously or periodically collect context information generated based on interactions between a potential customer and dynamic advertisement content and forward the information to the content center server 110. The content presentation server 106 is also configured to display changes to the advertisement content generated by the contact center server 110 based on the updated context information. Thus, updates to the context information are informed by the changes to the advertisement content and vice versa. The content center broker server 108 is adapted to exchange context information and advertisement content between the content presentation server 106 and the contact center server 110.

Each of the content presentation server 106, the content center broker server 108 and the content center server 110 is a combination of hardware, including one or more processors, one or more physical memory modules and specialized software engines that execute on the processor of the server to receive data from other components of the system 100, transmit data to other components of the system 100, and perform functions described herein. In some embodiments, the content center broker server 108 and the content center server 110 are owned by the same business entity, while the content presentation server 106 is owned by a separate entity, such as a third-party content host. In this instance, the context information collected by the content center broker server 108 and the content center server 110 may be limited due to limited communication of personal data by the third-party content presentation server 106. In some embodiments, all three servers 106, 108 and 110 are owned by the same business entity.

Figure 2:
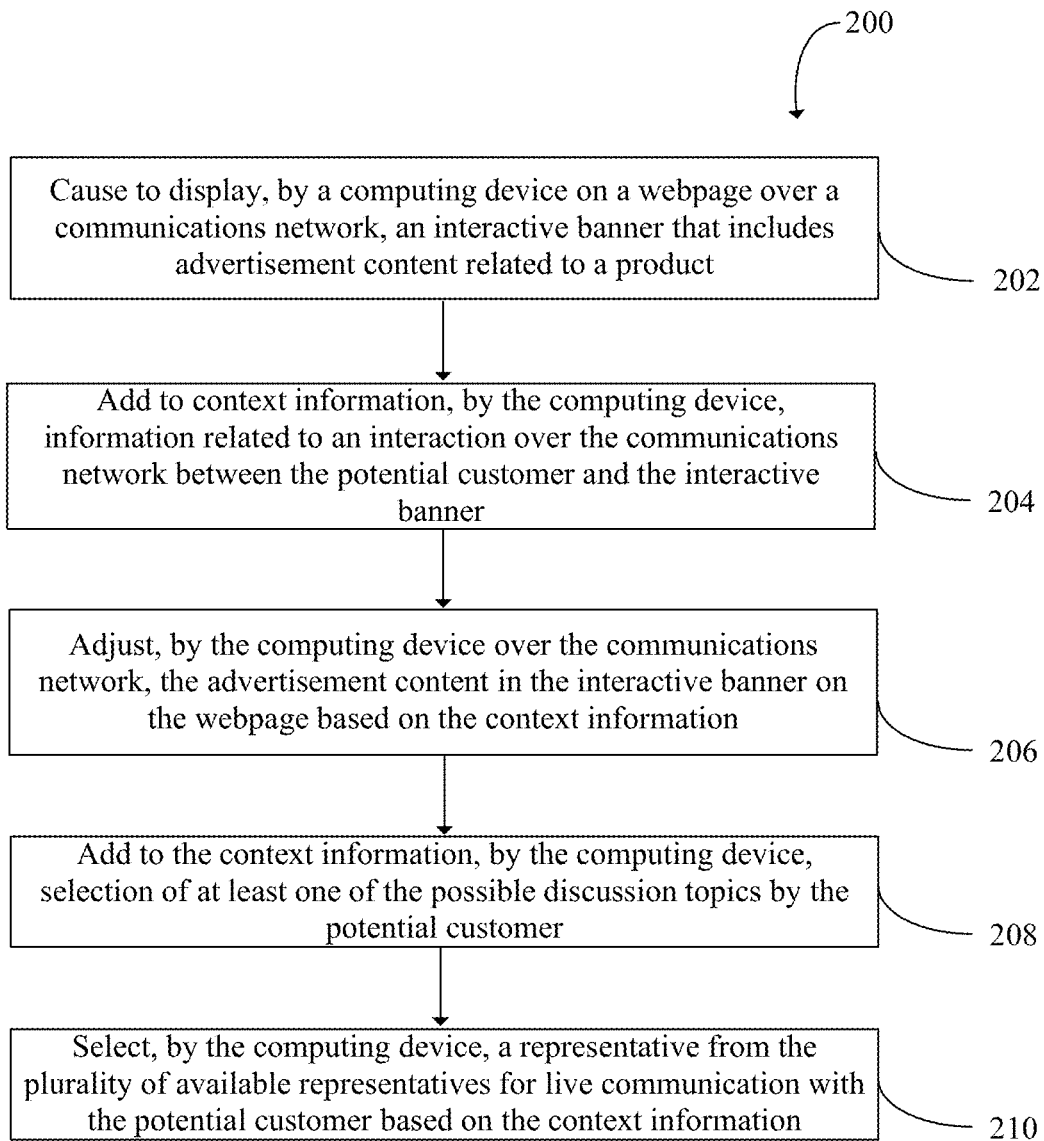
FIG. 2 is an illustrative process for facilitating live communication between a potential customer and an enterprise within the system of FIG. 1 in relation to an advertised product, according to an illustrative embodiment of the invention.

FIG. 2 is an illustrative process 200 for facilitating live communication between a potential customer and an enterprise within the system 100 of FIG. 1 in relation to an advertised product, according to an illustrative embodiment of the invention. At the instruction of the contact center 110 via the contact center broker 108, the content presentative server 106 is adapted to display on a webpage advertisement content related to at least one product (step 202). The advertisement content can be developed by the contact center server 110. The advertisement content, which is in the form of an interactive banner, displays an initial greeting to the potential customer. The initial greeting can include one or more questions to the potential customer, such as whether the potential customer is interested in communicating live with a representative of the business entity associated with the advertisement content regarding at least one product offered by the business entity. For example, the interactive banner can display options that let the potential customer select whether he is interested in obtaining more information about the product by speaking with a representative at a specific time, scheduling to speak with a representative at a future date, or declining live engagement altogether. Generally, the offer to communicate live with a representative is determined live during run time and is dependent on a body of context information, including the availability of the pool of representatives associated with the business entity. In some instances, only a static banner is displayed to a potential customer over a webpage without making an offer to speak live to a sales representative. A third-party advertising service, such as AdWords, can be used to administer the banner advertisement.

In some embodiments, if the potential customer is receiving the advertisement from a website affiliated with the content center server 110, and the potential customer can log in or create an account with the content center server 110 via the website, the content center server 110 is able to obtain more information about the potential customer, thereby allowing the contact center server 110 to provide more customized banner advertisement to the registered user. For example, the advertisement content can be both sales and service focused for a registered user, including information related to new products as well as service offers regarding existing products the person has already purchased. The account data of the registered user can be a part of the context information used by the contact center server 110 to enhance and personalize advisement content for the user.

Figure 3:
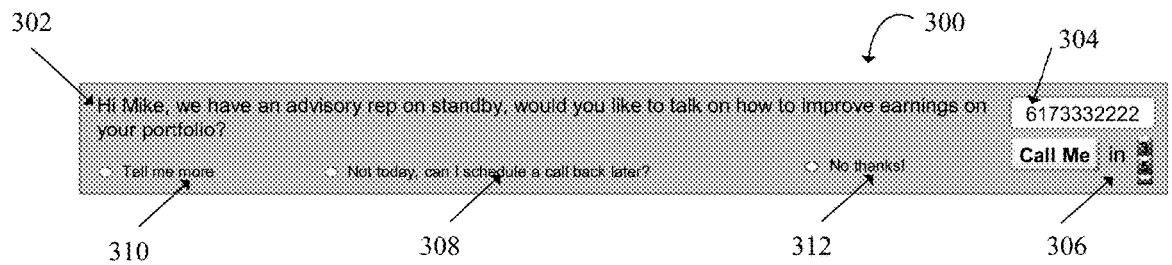
FIG. 3 shows an exemplary customized, dynamic banner advertisement formulated by the contact center server of FIG. 1 to initiate engagement with a potential customer, according to an illustrative embodiment of the invention.

FIG. 3 shows an exemplary customized, dynamic banner advertisement 300 formulated by the contact center server 110 of FIG. 1 to initiate engagement with a potential customer, according to an illustrative embodiment of the invention. Because the potential customer is a registered user, the contact center 110 is able to obtain personal information about the potential customer (e.g., his name, phone number and products of interest). The contact center server 110 can deliver, via the contact center broker server 108 and the content presentative server 106, the customized, dynamic banner 300 to the potential customer that includes a personalized greeting 302 asking the potential customer if he would like to speak with a representative about a specific topic that may be of interest to him. Further, the banner 300 can be pre-loaded with the potential customer's phone number 304 at which the customer is likely to be reached by a representative. The potential customer is also offered the options to speak with the representative at a specific time 306, schedule a call back at a future time 308, learn more about the advertised topic 310, or decline further engagement 312.

In some embodiments, the advertisement is displayed on a third party website not affiliated with the content center server 110, and the potential customer cannot log into his account or create an account with the content center server 110. In this case, the content center server 110 may obtain limited information on the potential customer, such as general information about the website on which the advertisement was placed (e.g., the content displayed of the website other than the advertisement content) and/or the nature of the advertisement. Hence, the resulting banner advertisement may be more generic, but still offers similar options as the personalized banner 300. For example, the banner can be configured to ask the potential customer to enter his phone number to receive a call back from a sales representative. As another example, the greeting displayed by the banner is less tailored and asks a broad question to try to pique the potential customer's interest. Further, the advertisement content can be more sales focused, and less focused on services.

As illustrated by the banner 300 of FIG. 3, the contact center server 110 can make the decision (e.g., at run time) to allow a potential customer to speak live with a sales representative based on the context information collected thus far. Exemplary context information at this initial engagement/offer stage includes the availability of the sales representatives, data related to the available sales representatives, the nature of the product advertised and/or one or more market conditions. Market conditions can include both planned and unplanned conditions. Planned market conditions include, but not limited to, seasonal fluctuations (e.g., tax seasons), market activities (e.g., options expiration or month end), marketing campaigns, etc. Unplanned conditions include, but not limited to, unexpected market fluctuations, initial public offering (IPO) launches, change in federal or state policies, etc. Data related to available sales representatives include each representative's educational background, areas of expertise and work experience.

As an example, if the contact center server 110 determines that there is no availability among the representative group, the contact center server 110 is adapted to instruct the contact center broker server 108 to display a static banner on the webpage via the content presentation server 106 without an offer to communicate live with a sales representative. The static banner can show predefined discussion topics that are aligned with general product information. The static banner includes at least one of enhanced media, a virtual agent and/or an option to schedule a callback to speak with a live representative at a later time. In addition to representative availability, the contact center server 110 can cause the display of a static banner in other situations, such as high call volume or representative prioritization. For example, based on the context information collected on a potential customer thus far, if the contact center server 110 determines that the potential customer is unlikely to make a purchase, then the contact center server 110 is like to display a static banner to the potential customer. In another example, if there is one or more market conditions (e.g., busy tax season, an IPO launch, an/or a recent marketing campaign) that tend to trigger an influx of customer-initiated inquiries to overload agent demand, resulting in limited agent availability, the contact center server 110 can cause the content presentation server 106 to display a predefined, context-based static banner to one or more potential customers.

With reference to the process 200 of FIG. 2, after the interact banner is served to a potential customer, the content center broker server 108 is adapted to instruct the content presentative server 106 to monitor and collect information regarding the potential customer's interaction with the banner, which is used to augment the existing context information (step 204). The interaction-related data includes, for example, click-throughs or other responses by the potential customer to the banner advertisement. Generally, the content center broker server 108 attempts to collect as much information as possible about the potential customer based on his interaction with the advertisement content offered by the content presentation server 106, such that the collected information supplements the existing context information. The context information is passed by the contact center broker server 108 to the contact center server 110, which uses the context information to further customize the advertisement and tailor the customer-representative engagement. For example, the responses collected from the potential customer to the advertisement banner, which may include an indication from the potential customer regarding whether to accept the offer to communicate live with a sales representative, becomes a part of the context information. In addition, the contact center server 110 can collect as context information the number of outstanding live communication offers, and the number of offers that are accepted, rejected, or abandoned. Further, the contact center server 110 can dynamically update the availability of the representatives based on one or more of these numbers.

The contact center server 110 is adapted to use predictive analytics to dynamically determine the next action based on the context information collected thus far, and the next action informs the dynamic content displayed in the advertisement banner in a feedback manner. Specifically, the contact center server 110, through the contact center broker server 108, can cause the content presentation server 106 to dynamically adjust the advertisement content in the interactive banner (e.g., banner 300) on the webpage based on the context information collected (step 206).

Figure 4:
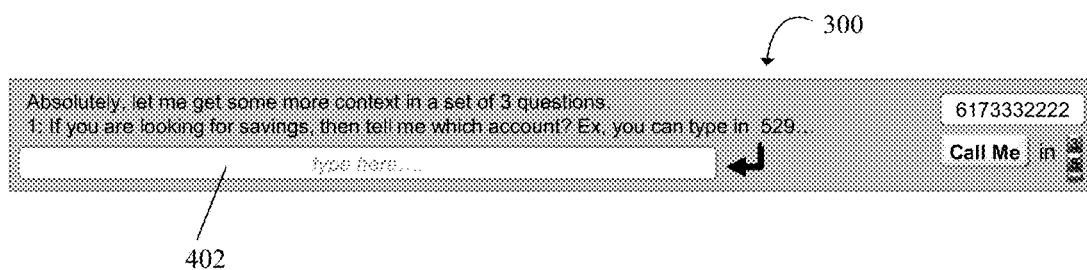
FIG. 4 shows the banner advertisement of FIG. 3 updated to refine engagement with a potential customer, according to an illustrative embodiment of the invention.

FIG. 4 shows the banner advertisement 300 of FIG. 3 updated to refine engagement with a potential customer, according to an illustrative embodiment of the invention. The banner advertisement is updated based on the potential customer indicating that he would like to speak with a sales representative live about a general product topic, such as how to improve earnings on an investment portfolio, in response to the initial engagement content. The adjusted content in the banner 300 can include one or more possible refined discussion topics related to the general product topic. These refined discussion topics can be customized based on a combination of one or more factors including the context information collected thus far about the customer and about the available sales representatives, such as banner-to-representative usage information for a given time, time of the day when customers are more receptive to banner advertisement, and/or relevant market conditions or events in the day (e.g., a popular game on the ESPN channel). Other factors include information about the banner host site (i.e., site provided by the content presentation server 106) and banner host topics. As another example, the refined discussion topics offered can be aligned with the specialties of the available sales representatives so that a representative can be easily matched to the potential customer to have a live conversation with the customer. As another example, the refined discussion topics offered can be customized based on one or more market conditions and marketing campaigns. In general, the refined topics are presented as a hierarchy of multi-level topics. The topic in the base level can be predefined and configured by a marketing analyst for at least one of static and dynamic flows, such as the topics offered in the initial banner advertisement of FIG. 3. Based on the context information collected thus far about the customer and about the available sales representatives, such as representative availability and/or customer interest, the contact center server 110 is able to determine the optimal level of refinement as well as the topic for each level (e.g., 1 level of refined topic or 4 levels of refinement) in the successive banner content adjustment.

As shown in the banner 300 in FIG. 4, in relation to the general topic of improving earnings on an investment portfolio presented in the banner 300 in FIG. 3, one refined topic is "if you are looking for savings, then tell me which account." A text box 402 is made available on the interactive banner 300 for the potential customer to type in his response. The content presentation server 106, at the instruction of the contact center broker server 108, is configured to collect the response from the potential customer and pass the response to the contact center server 110 for further analysis.

With reference to the process 200 of FIG. 2, after the contact center server 110 receives the response from the potential customer, which includes a selection of the refined topic he would like to discuss with a live representative, the contact center server 110 is adapted to add the response to the existing context information associated with the customer (step 208). The contact center server 110 can use natural language process and/or other algorithmic techniques to parse the response and classify the information. In addition to discussion topics, other data that can be added to the context information in relation to acceptance of a live communication offer include the questions and refined topics presented by the interactive banner, questions raised by the potential customer in response, and any additional context/profile information about the potential customer (e.g., the location of the customer and/or response time by the customer). In some embodiments, steps 204, 206 and 208 are iterated such that multiple levels of refined topics are presented to a potential customer, where each level of refinement is determined based on the context information maintained at that time, including information collected from the previous iteration.

Using the context information collected thus far, the contact center server 110 is configured to select a representative from the pool of available representatives for live chat with the potential customer (step 210). For example, the contact center server 110 uses the context information to filter and process data related to the available representatives to determine a target representative that has the skills to converse productively with the potential customer, thereby increasing sales opportunities. The representative selected has the appropriate background (e.g., education, skills and/or experience) compatible with the context information collected through the series of dynamic advertisement described above. In some embodiments, the representative population is managed in predefined representative groups that include representatives who are assigned multi-level skills in a range based on experience, training, skill proficiency and other measurable qualities. Similarly, static and dynamic banner content and full context information are created and maintained in a manner to match the representative groups and skill sets. After a representative is selected for a particular customer, the contact center server 110 is adapted to supplement the context information of that customer with the pertinent data related to the selected representative.

Figure 5:
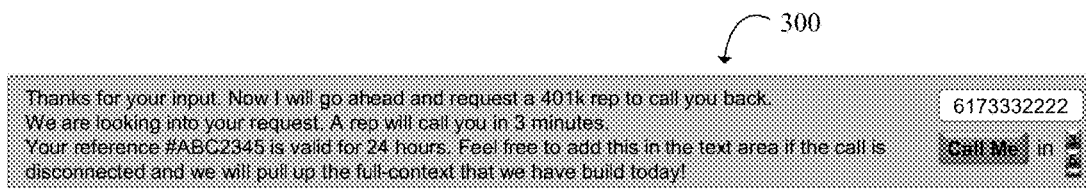
FIG. 5 shows the banner advertisement of FIG. 4 updated to reflect representative assignment status, according to an illustrative embodiment of the invention.

In some embodiments, the contact center server 110 updates the dynamic advertisement content of the interactive banner served to the potential customer to inform him of the latest status. The contact center server 110 can convey information related to the selected representative to the contact center broker server 108, which in turn forwards the information to the content presentation server 106 for display to the potential customer. FIG. 5 shows the banner advertisement 300 of FIG. 4 updated to reflect representative assignment status, according to an illustrative embodiment of the invention. As illustrate, the banner 300 can display a message informing a potential customer that a representative is being assigned and will contact the potential customer within a specific time period. Further, a reference number can be assigned to the live communication engagement. In some embodiments, the selected representative contacts the potential customer over a second communications network, which may or may not be the same as the network 104 over which the advertisement banner is served to the customer. For example, the selected representative can call the potential customer over a telephonic network at a number associated with the customer. Even though the present invention describes establishing voice communication between the selected representative and the potential customer, other means for live communication are contemplated and are within the scope of the present invention. For example, the selected representative can launch a live chat session with the potential customer on the webpage from which the inactive advertisement banner is displayed or on another webpage. In some embodiments, the contact center server 110 and or the contact center broker server 108 can automatically determine and recommend a preferred communication channel through which the selected representative can contact the potential customer based on, for example, detection of a location of the customer or the computing device 102 on which the customer accessed the banner advertisement. For example, if the potential customer is accessing the banner advertisement through an application installed on his portable phone, then the contact center server 110 can recommend the selected representative to reach out to the customer via the same means.

In some embodiments, after the interactive communication (e.g., telephonic conversation) between the selected sales representative and the potential customer is completed, the sales representative can update the context information to include comments regarding the communication, such as the representative's impression of the customer's reaction to the conversation, the agreed-upon next step, etc. The contact center 110 can offer more targeted advertisement content to the potential customer customized using the information obtained through the live communication.

Figure 6:
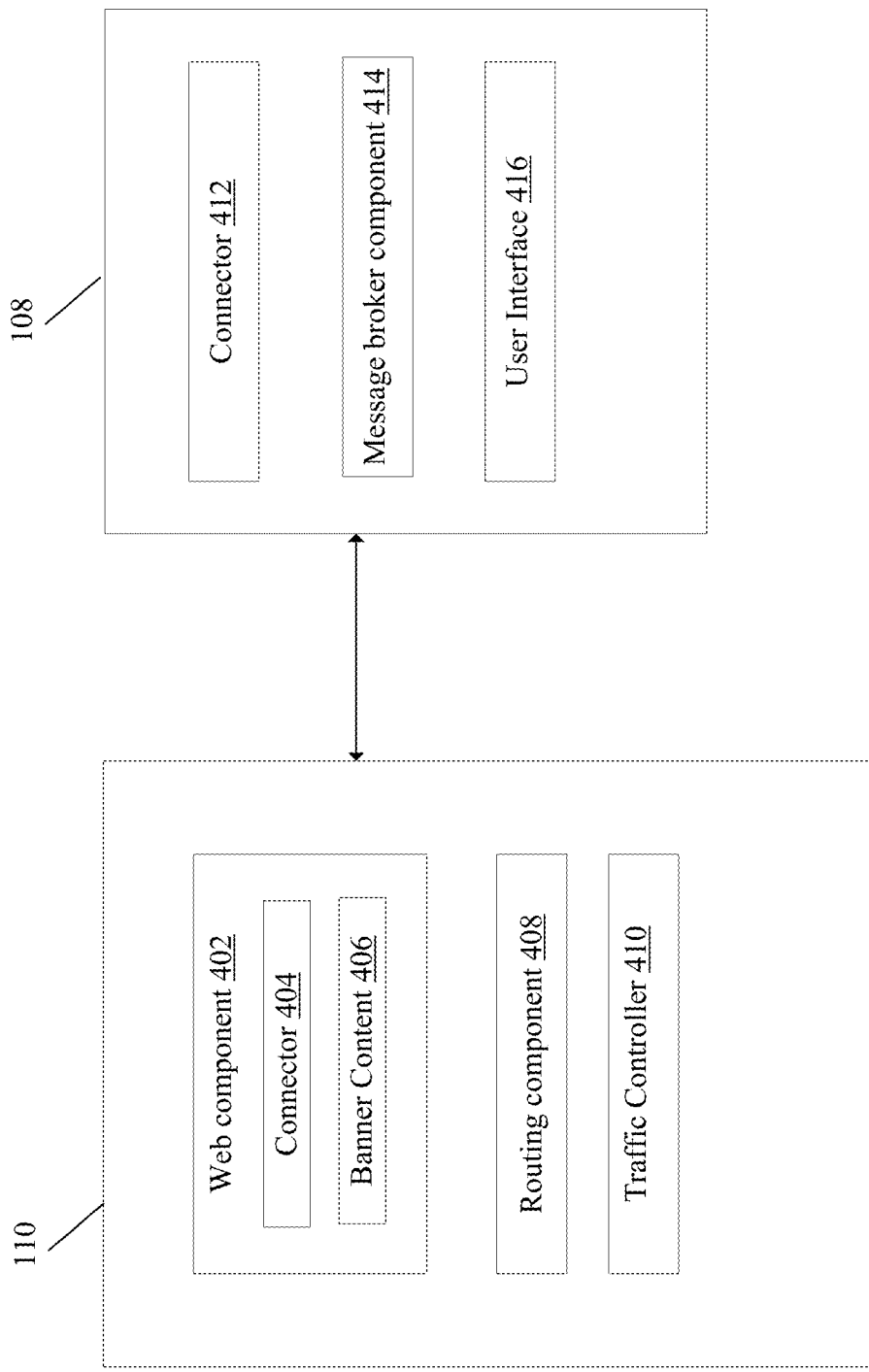
FIG. 6 shows an exemplary implementation of the contact center broker server and the contact center server of the system of FIG. 1, according to an illustrative embodiment of the present invention.

FIG. 6 shows an exemplary implementation of the contact center broker server 108 and the contact center server 110 of the system 100 of FIG. 1, according to an illustrative embodiment of the present invention. As shown, the contact center server 110 includes a web component 402, a routing component 408 and a traffic controller 410. In some embodiments, the web component 402 is generally configured to dynamically create, update and manage advertisement content for presentation on a webpage via the content presentation server 106. Specifically, the web component 402 includes at least a connector module 404 used to configure connections with one or more websites where the advertisement content is presented. The connector module 404 can be an Application Program Interface (API) program. The web component 402 also includes a banner content module 406 that contains one or more widgets, such as in hypertext markup language (HTML), for configuring content in a web-based interactive banner (e.g., the banner 300 of FIGS. 3, 4 and 5). In some embodiments, the routing component 408 of the contact center server 110 is configured to establish communication channels with one or more potential customers following a banner advertisement session, schedule callbacks with potential customers, and update context information for potential customers.

The traffic controller 410 of the contact center server 110 is a centralized, real-time system configured to use predictive modeling to analyze context information and perform at least one of: (i) determining dynamical updates of content in a banner advertisement (e.g., determining the initial greetings and the possible discussion topics to present to a potential customer), (ii) determining whether to serve a static or dynamic banner to a potential customer, and (ii) matching a representative from a pool of available representatives to a potential customer for live communication. In some embodiments, the traffic controller 410 is configured to apply one or more sets of predefined rules to certain context information to determine/control the number and type of banner impressions on a host site, along with the level of topic granularity displayed. These predefined rule sets can stipulate the rules for banner impressions and topic granularity based on time of the day or year, type of host sites, representative availability, and other criteria. For example, a predefined rule set can stipulate on Sunday morning the display of equal impressions with a 3-level topic granularity on both sports and home improvement websites, and in the evening the same rule set can route more banner traffic to the sports site and reduce the traffic on the home improvement website by displaying a single level granularity. The traffic controller 410 can also change banner interactions from dynamic to static and vice versa. Further, the traffic controller 410 can match the pool of representatives to the potential customers who would like to interact with the representatives based on the predefined rule sets. The traffic controller 410 can also include natural language processing and machine learning capabilities to parse text-based responses from potential customers or implement a virtual agent when a live representative is not available.

In some embodiments, the contact center server 110 can maintain one or more databases (not shown) to store the banner content and/or context information and can modify the stored information based on marketing needs for both planned and unplanned marketing conditions. The databases can also store the predefined rule sets of the traffic controller 410, along with providing mechanisms to modify their values in real-time.

As shown, the contact center broker server 108 includes a connector component 412, a message broker component 414 and a user interface 416. In some embodiments, the connector component 412 is used to configure connections between the contact center server 110 (e.g., the connector module 404 of the contact center server 110) and the content presentation server 106, such that the contact center server 110 can present targeted advertisement content on one or more desired websites of the content presentation server 106. In some embodiments, the message broker component 414 is configured to exchange information between the contact center server 110 and the content presentation sever 106, such as forwarding instructions for the type of context information to collect from the contact center server 110 to the content presentation server 106 and transmitting desired context information from the content presentation server 106 to the contact center server 110.

The user interface 416 is configured to fine tune the perform of the message broker component 414 and permit real-time configuration of the various functionalities of the contact center broker server 108 by the contact center server 110 and/or the content presentation server 106. Specifically, the user interface 416 can serve one or more of the following functions: 1) control configuration of the rules of the traffic controller 410 based on host, time, representative group, campaign and/or other criteria; 2) incorporate configuration dials to adjust the rule values in real-time, 3) provide real-time graphical representation of traffic; 4) display real-time, historical and reporting data as well as forecast or predictive values; 5) provide a list of hosts displaying the banner advertisement; 6) maintain logs to track activities; 7) provide user interface access management; 8) provide alerts and other monitoring functions; 9) provide static and dynamic banner content management with multi-tier context/topic dialog management; and 10) provide banner user interface content management.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile computing device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile computing device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computer-implemented method for facilitating live communication between a potential customer and an enterprise in relation to a product, the method comprising:

causing to display, by a computing device on a webpage over a communications network, an interactive banner located on the webpage that includes advertisement content related to the product, the advertisement content comprising an offer to the potential customer to communicate live with the enterprise about the product, the offer determined based on context information that includes at least availability of one or more representatives of the enterprise;

adding to the context information, by the computing device, information related to an interaction over the communications network between the potential customer and the interactive banner, the information includes an indication by the potential customer accepting the offer to communicate live, wherein the offer is made over the interactive banner;

adjusting, by the computing device over the communications network, the advertisement content in the interactive banner on the webpage, adjusting the advertisement content comprises generating one or more possible discussion topics related to the advertised product that are customized to align with expertise of one or more available representatives identified in the context information so as to encourage live engagement with the potential customer;

adding to the context information, by the computing device, selection of at least one of the possible discussion topics by the potential customer via the interactive banner over the communications network; and selecting, by the computing device, a representative from the one or more available representatives for live communication with the potential customer, wherein selecting the representative is based on matching the context information with information about the one or more representatives.

2. The method of claim 1, further comprising the selected representative contacting the potential customer over a second communications network to discuss the at least one selected discussion topic, the second communication network comprising one of an internet or voice network.

3. The method of claim 2, wherein the second communications network is the same as the communications network.

4. The method claim 1, wherein the information about the one or more representatives comprises at least one of experience, education or expertise of the representatives.

5. The method of claim 1, wherein the context information further comprises one or more of a market condition, information about the potential customer, information about each available representative, a time of day, and a time of year.

6. The method of claim 5, wherein the information about the potential customer comprises one or more of a location of the potential customer, a response time of the potential customer to the advertisement content in the interactive banner, or a topic of interest expressed by the potential customer.

7. The method of claim 1, further comprising presenting the interactive banner as a static banner without displaying the offer to communicate live, if there is no availability among the one or more representatives.

8. The method of claim 7, further comprising displaying on the static banner a virtual agent or an option to schedule a callback.

9. The method of claim 1, further comprising dynamically updating the availability of the one or more representatives based on a number of indications received from potential customers to communicate live, a number of indications received from potential customers rejecting live communication and a number of failed attempts to communicate live.

10. The method of claim 1, further comprising prioritizing the one or more representatives based on the context information by assigning the one or more representatives to potential customers who are likely to make a purchase.

11. The method of claim 1, wherein the interactive banner further displays at least a portion of the information about the selected representative.

12. The method of claim 1, further comprising automatically determining a communication channel between the selected representative and the potential customer based on at least one of a location of the potential customer or a computing device on which the potential customer accessed the advertisement content.

13. The method of claim 1, further comprising updating the context information to incorporate feedback from the selected representative on the live communication.

14. The method of claim 13, further comprising offering more targeted advertisement content to the potential customer, the more targeted advertisement content customized based on the updated context information.

15. A computer program product, tangibly embodied in a non-transitory computer readable storage device, for facilitating live communication between a potential customer and an enterprise in relation to a product, the computer program product including instructions operable to cause the client computing device to:

cause to display on a webpage over a communications network an interactive banner that includes advertisement content related to the product, the advertisement content comprising an offer to the potential customer to communicate live with the enterprise about the product, the offer determined based on context information that includes at least availability of one or more representatives of the enterprise;

receive information related to an interaction over the communications network between the potential customer and the interactive banner, the information includes an indication from the potential customer accepting the offer to communicate live wherein the offer is made over the interactive banner;

add to the context information the received information;

adjust the advertisement content in the interactive banner on the webpage, adjust the advertisement content comprises generate one or more possible discussion topics related to the advertised product that are customized to align with expertise of one or more available representatives identified in the context information so as to encourage live engagement with the potential customer;

add to the context information selection of at least one of the possible discussion topics by the potential customer via the interactive banner over the communication network; and select a representative from the one or more available representatives for live communication with the potential customer, wherein selection of the representative is based on matching the context information with information about the one or more representatives.

16. The computer program product of claim 15, wherein the context information further comprises one or more of a market condition, information about the potential customer, information about each available representative, nature of the advertised product, a time of day and a time of year.

17. The computer program product of claim 15, wherein the information about the one or more representatives comprises at least one of experience, education or expertise of the representatives.

18. The computer program product of claim 15, further comprising instructions operable to cause the client computing device to present the interactive banner as a static banner without displaying the offer to communicate live, if there is no availability among the one or more representatives.

19. The computer program product of claim 15, further comprising instructions operable to cause the client computing device to prioritize the one or more representatives by matching, based on the context information, the representatives to potential customers who are likely to make a purchase.

* * * * *